United States Patent [19]

Brockman

[11] 4,362,317

[45] Dec. 7, 1982

[54] EXTENSIBLE FRAME STRUCTURE FOR TRAILER TYPE LAND VEHICLE

[75] Inventor: Arthur C. Brockman, 14200 Jay Rd, Detroit, Mich. 48228

[73] Assignee: Arthur C. Brockman, Detroit, Mich.

[21] Appl. No.: 216,078

[22] Filed: Dec. 15, 1980

[51] Int. Cl.³ .............................................. B62D 53/06
[52] U.S. Cl. .................................... 280/656; 296/204
[58] Field of Search ....................... 280/656, 638, 142; 296/203, 204, 26, 27

[56] References Cited

U.S. PATENT DOCUMENTS

| 2,812,088 | 11/1957 | Cadillac et al. | 280/656 X |
| 4,103,931 | 8/1978 | Weiss | 280/656 |
| 4,230,334 | 10/1980 | Mabry, Jr. | 280/656 X |

*Primary Examiner*—Robert J. Spar
*Assistant Examiner*—Donald W. Underwood
*Attorney, Agent, or Firm*—Barnes, Kisselle, Raisch, Choate, Whittemore & Hulbert

[57] ABSTRACT

Shoes anchored to the webs of the I-beams of a sliding frame slide on the inboard lower flanges of the I-beams of the fixed frame, and a longitudinal rail on each said lower flange prevents lateral disengagement of the shoes therefrom. The I-beams of the two frames have the same height.

14 Claims, 4 Drawing Figures

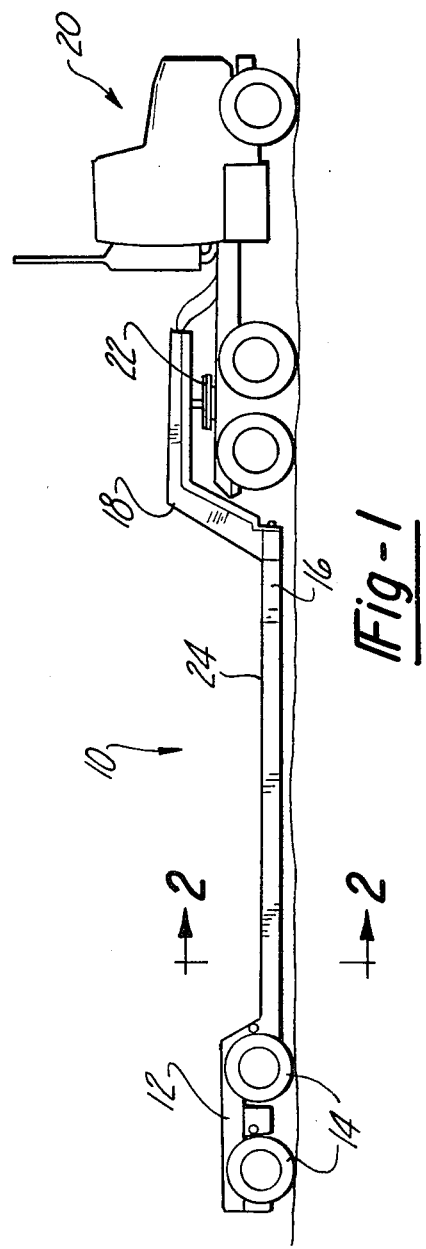
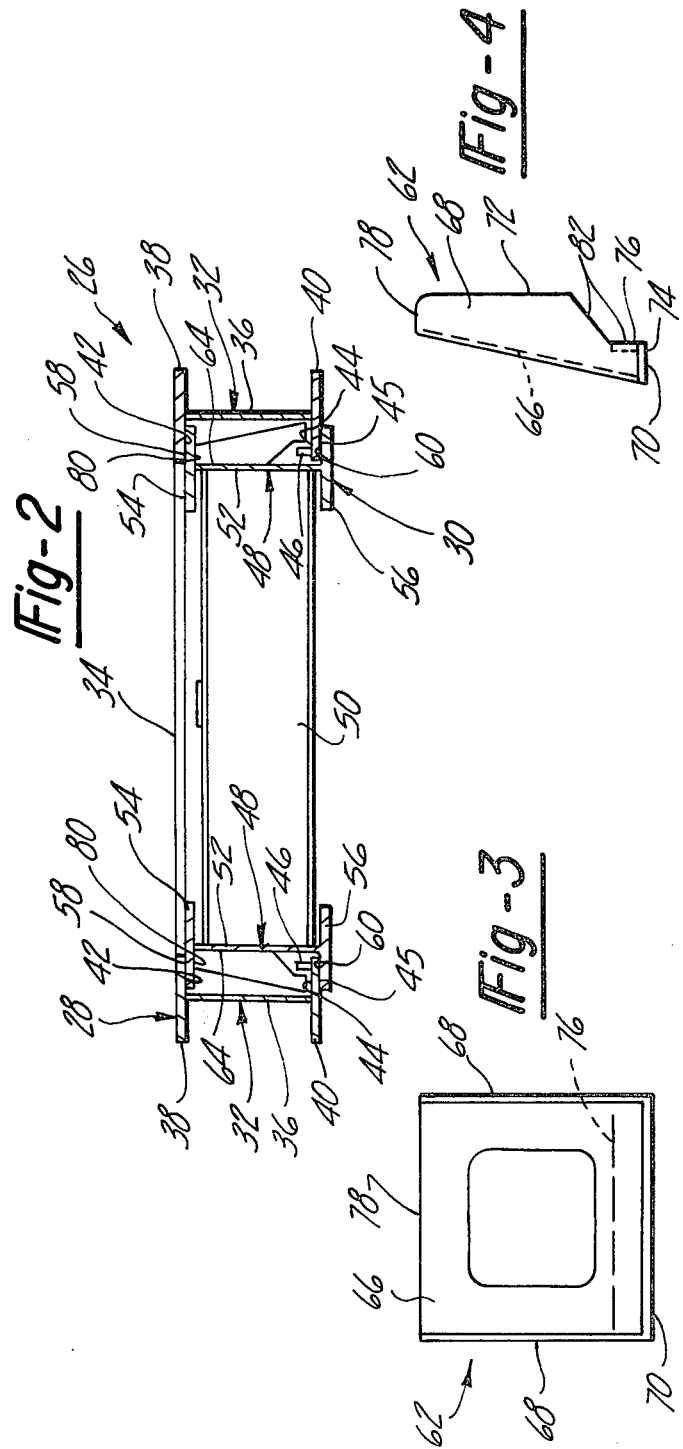

EXTENSIBLE FRAME STRUCTURE FOR TRAILER TYPE LAND VEHICLE

This invention relates to an extensible frame structure for a trailer-type land vehicle. Extensible frames are typically useful in low bed semitrailers used to transport unusually large and heavy loads over highways. Accordingly, a low bed semitrailer is selected for illustration of the invention.

A typical extensible trailer frame has an outer main frame usually fixed with respect to the trailer bed and an inner frame longitudinally movable within the main frame to adjust the length of the overall frame structure. In a typical conventional structure, the main frame is comprised of a pair of longitudinally extending laterally spaced apart I-beams, and the slider also comprises a pair of laterally spaced I-beams, the slider fitting slidably within the vertical webs and top and bottom inboard horizontal flanges of the main frame. Each top and bottom flange of the main frame has a vertical dimension of about one inch. A vertical clearance must be left between the main frame and the slider in order to insure freedom of relative movement between the main frame and slider for effecting length adjustments of the vehicle frame. This means that the slider can have a maximum height which is more than two inches less than that of the main frame.

When the frame is in its shortened condition, its load carrying capacity is determined largely by the height of the main frame I-beams. However, when the vehicle frame is extended, its load-carrying capacity is suddenly reduced to that of the lesser height I-beams of the slider. To eliminate this objectional characteristic, it would be desirable that the slider I-beams have a load carrying capacity equal to that of the main frame I-beams. Stated in another way, it would be desirable that the frame, in extended condition, have the same load-carrying capacity as it if comprised integral main frame I-beams of extended length. Insofar as I am aware, no one heretofore has been able to achieve such a result.

The object of the present invention is to provide a very simple, inexpensive extensible frame structure for a trailer-type land vehicle wherein in extended condition, the combined main frame and slide frame has substantially the same beam strength and load bearing capacity as if each interengaged main frame and slider frame couple comprised instead an integral main frame I-beam of extended length. One form of the invention is illustrated in the accompanying drawings.

FIG. 1 is a partly diagrammatic side elevational view of a low bed semitrailer incorporating the present invention.

FIG. 2 is an enlarged scale sectional view on line 2—2 of FIG. 1 showing the frame separately from the trailer bed.

FIG. 3 is a further enlarged elevational view of a sliding shoe forming part of the invention.

FIG. 4 is an end elevational view of the shoe shown in FIG. 3.

Shown in the drawings is a low bed semitrailer 10 having a rearward end 12 supported by ground engaging wheels 14 and a forward end 16 attached to a gooseneck type drawbar 18, in turn having a draft connection to a highway type tractor 20 through a fifth wheel type coupling 22. Trailer 10 has a load carrying bed 24 supported by an extensible frame 26 constructed in accordance with the present invention.

Frame 26 includes a fixed outer frame section 28 and an inner frame section 30 slidable with respect to frame section 28. Frame section 28 comprises a pair of I-beams 32 which extend longitudinally of trailer bed 24 and which are secured in laterally spaced apart relation by cross members 34. Each I-beam 32 has a web 36 extending vertically between an upper flange 38 and a lower flange 40. Flange 38 has an under surface 42 extending inboard of web 36 and flange 40 has an upper surface 44 and an under surface 45 extending inboard of the web.

A rail 46 projects upwardly of flange surface 44 for a purpose to be described. This rail extends longitudinally at least through the range of expected relative movement of frame sections 28, 30. Typically, rail 46 comprises an elongate bar or strap of metal welded to flange surface 44. However, it would be within the invention to form rail 46 in other ways, such as by turning up the inboard edge of flange 40 or by forming it integrally with flange 40 at a location adjacent its inboard edge as shown. Except for rail 46, the structure of fixed frame section 28 is conventional and frame section 28 is anchored to trailer bed 24 in a conventional manner.

Frame section 30 comprises a pair of longitudinal extending I-beams 48 secured in laterally spaced apart relation by a plurality of longitudinally distributed cross members 50. Each I-beam 48 has a web 52 extending vertically between an upper flange 54 and a lower flange 56. Each upper flange 54 has an upper flange 58 extending outboard of web 52 and being slidably engaged with an under surface 42 of the upper flange 38 of an I-beam 32. Each lower flange 56 has an upper surface 60 extending outboard of web 52 and being slidably engaged with under surface 45 of the lower flange 40 of an I-beam 32. Preferably, I-beams 48 have the same height as I-beams 32.

A shoe 62 is anchored to the outboard face 64 of each web 52. Each shoe comprises a front panel 66 secured as by welding to end panels 68 and a bottom panel 70. Panel 70 is relatively narrow, extending only part way from front panel 66 to the rear edges 72 of end panels 68 as best shown in FIG. 4. The ends of panel 70 are secured as by welding to end panels 68. The rearward edge 74 of panel 70 is reinforced by a bar 76 secured thereto as by welding, the ends of bar 76 being secured as by welding to end panels 68.

The rearward edges 72 of end panels 68 are anchored as by welding to the outboard face 64 of flange 52, each shoe 62 being positioned vertically so that its upper edge 78 is engaged against the under side 80 of an upper flange 54. When shoes 62 are thus positioned, their lower end portions project into the horizontal space between webs 36 and rails 46. End panels 68 have cutaway portions 82 which provide both a vertical and a horizontal clearance with respect to rails 46. Bottom panels 70, in effect, form runners which slidably engage against upper surfaces 44 of lower flanges 40. Shoes 62 are preferably mounted at or adjacent the rearward end of sliding frame section 30.

In a typical semitrailer 10, I-beams 32, 48 have a height in the range from about 10 inches to about 20 inches; shoes 62 are dimensioned vertically to fit between flange surfaces 42, 44 of I-beams 32, may have a length more or less approximating their height, and runners 70 have a width determined at least in part, by the horizontal distance between webs 36 and rails 46, for example, about 1½ inches. However, these dimensions are illustrative only and are not delimiting.

In use, it will be assumed that semitrailer 10 is coupled with tractor 20 in the manner described with extensible frame 26 in its shortened condition. As is conventional, frame section 30 is connected to drawbar 18 and frame sections 28,30 are secured against relative movement by such means as a drop pin (not shown). To extend frame 26, the drop pin is removed, the brakes are set on trailer wheels 14, and tractor 20 is driven forwardly. Runners 70 slide forwardly on upper surfaces 44 of lower flanges 40, and flanges 54, 56 slide forwardly relative to flanges 40,38 respectively. Rails 46 prevent runners 70 from sliding laterally out of engagement with surfaces 44 during this movement. When frame 26 has been extended, forward movement of tractor 20 is halted and the drop pin is returned to again secure frame sections 28,30 against further relative movement.

Since I-beams 32,48 have the same height, frame section 30 has the same beam strength and load-carrying capacity as frame section 28 in extended condition of frame 26. Stated in another way, frame 26 in extended condition, has the same beam strength and load-carrying capacity as if each pair of I-beams 32,48 were integral extensions of one another. To shorten frame 26, the brakes for trailer wheels 14 are again set, the drop pin removed, and tractor 20 is backed up until frame sections 28,30 are telescoped as shown in FIG. 1. The drop pin is then returned. During retracting movement of the frame section 30, the various interengaged flange and runner surfaces slide relative to each other and rails 46 again prevent runners 70 from sliding laterally out of engagement with surfaces 44.

I claim:

1. In a trailer type land vehicle, longitudinally extensible frame structure which comprises,
   a first frame section having beams secured in longitudinally extending laterally spaced relation,
   each beam having a vertical web and a lower flange portion which extends laterally inboard of said web, said flange portion having an exposed upper surface,
   a second frame section having beams secured in longitudinally extending laterally spaced relation,
   each of the latter said beams having a vertical web and a lower flange portion which extends laterally outward thereof,
   the webs of said second frame section being disposed between said flange portions of said first frame section,
   said flange portions of said second frame section projecting laterally beneath said flange portions of said first frame section,
   shoe means projecting laterally outboard of each web in said second frame section and having a lower surface,
   said lower surfaces being slideably engaged in load transmitting relation respectively on said upper surfaces,
   said beams of said second frame section having a height not substantially less than that of the beams of said first frame section,
   and means forming a longitudinally extending rail projecting upward from each flange portion of said first section inboard of said upper surface, said rails being effective to contain said shoe means against lateral disengagement from said upper surfaces.

2. The structure defined in claim 1 wherein each said rail comprises an elongate metal strip welded to a said flange portion.

3. The structure defined in claim 1 wherein said shoe means comprises a pair of shoes each anchored to an outboard face of said web to said second frame section.

4. The structure defined in claim 3 wherein each said lower surface has a longitudinal extent at least twice as great as the lateral extent thereof.

5. The structure defined in claim 4 wherein each shoe has a forward end, a rearward end, and a front which extends between said ends, said front being substantially longitudinally coextensive with said lower surface.

6. The structure defined in claim 1 wherein said shoe means comprises a pair of shoes, each anchored to an outboard face of a said web of said second frame section, each shoe having a forward end and a rearward end, said ends having lower portions which are relieved to provide vertical and lateral clearance relative to said rails.

7. The structure defined in claim 3 wherein each upper beam of said second frame section has an upper flange portion which extends laterally outboard of its respective web, each shoe having a top abutted against the under side of said upper flange portion.

8. The structure defined in claim 1 wherein said shoe means comprises a pair of shoes, each anchored to an outboard face of a said web of said second frame section,
   each said lower surface having a longitudinal extent at least twice as great as the lateral extent thereof,
   each shoe having a forward end, a rearward end, and a front which extends between said ends, said front being substantially longitudinally coextensive with said lower surface,
   each beam of said second frame section having an upper flange portion which extends laterally outboard of its respective web, said front of each shoe being abutted against the under side of one of said upper flange portions,
   said forward and rearward ends having lower portions which are relieved to provide vetical and lateral clearance relative to said rails.

9. In a trailer type land vehicle a longitudinally extensible frame structure comprising,
   a main frame section constructed and arranged to be supported by ground engaging wheels and having beams secured in longitudinally extending and laterally spaced apart generally parallel relation,
   each beam of said main frame section having a vertical web and a lower flange portion extending laterally of said web and having an exposed upper surface,
   a slide frame section having beams secured in longitudinally extending and laterally spaced apart generally parallel relation,
   each beam of said slide frame section having a vertical web and a lower flange portion extending laterally of said web,
   said webs of one of said frame sections being disposed between said webs of the other of said frame sections with said beams of said slide frame section extending in part generally longitudinally beyond one end of said beams of said main frame section,
   said flange portions of said beams of one of said frame sections extending laterally inwardly of their associated webs and said flange portions of said beams of the other of said frame sections extending outwardly of their associated webs, said lower flange portions of said slide frame section lapping, underlying and slideably engaging said lower flange portions of said beams of said main frame section, the free edge of the lower flange portion of each beam of said main frame section lies closely adjacent the web of its associated beam of the slide frame section, a shoe fixed to said web of each said beam of said slide frame section and having a runner lapping, overlying and lying closely adjacent to said upper surface of a lower flange portion of an associated beam of said main frame section for sliding and load transmitting engagement therewith, said webs of said beams of said slide frame section having a height which is not substantially less than the height of said webs of said beams of said main frame section.

10. The frame structure of claim 9 wherein said beams of said slide frame section have substantially the same height as that of said beams of said main frame section.

11. The frame structure of claim 9 wherein each of said shoes is mounted on its associated beam of said slide frame section adjacent the rearward end of its associated beam.

12. The frame structure of claim 9 which also comprises a longitudinally extending bar lying adjacent the free edge of and projecting upwardly from each said lower flange portion of said main frame section, said rails being constructed and arranged to contain said shoes against lateral disengagement from said upper surfaces of said lower flange portion of said beams of said main frame section.

13. The frame structure of claim 9 which also comprises each of said beams having an upper flange portion extending laterally of the web of its associated beam and in at least the same direction from its associated web as said lower flange portion of its associated web, the upper flange portion of each beam of said slide frame section lapping, underlying, and slideably engaging its associated upper flange portion of said main frame section, and said beams of said slide frame section and said main frame section being substantially the same height.

14. The frame structure of claim 13 wherein each of said shoes is mounted on its associated beam of said slide frame section adjacent the rearward end of its associated beam.

* * * * *